June 20, 1967     L. J. WOLF     3,326,314
INTERCONNECTED CONTROLS FOR PLURAL TRANSMISSIONS
Original Filed April 22, 1963     2 Sheets-Sheet 2
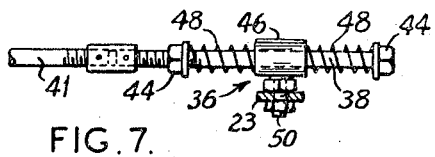
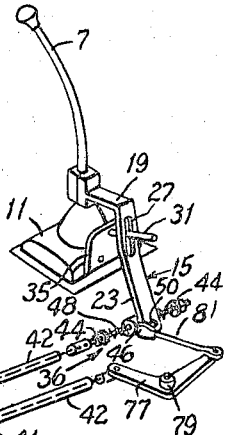
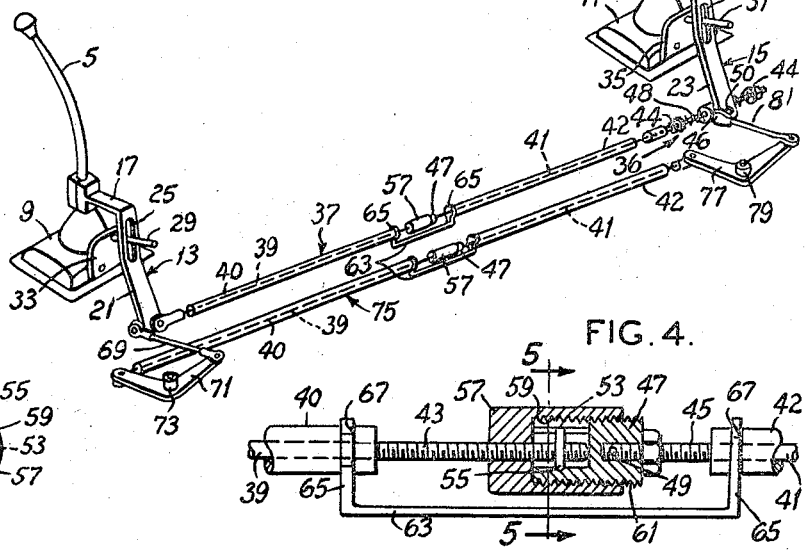
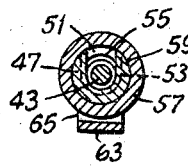
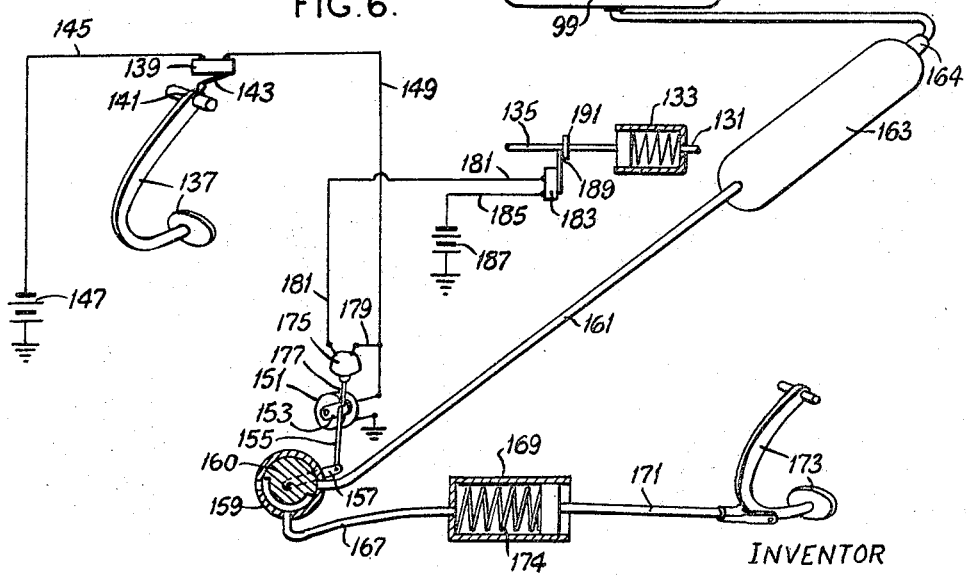
INVENTOR
LLOYD J. WOLF
BY Bedell & Burgess
ATTORNEYS

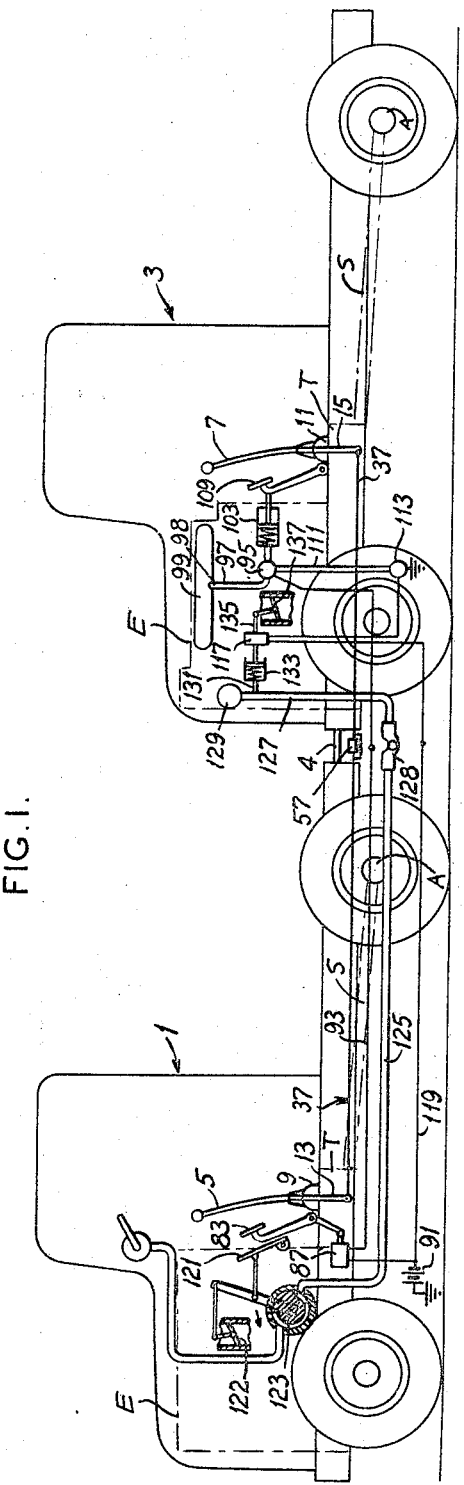

3,326,314
INTERCONNECTED CONTROLS FOR PLURAL TRANSMISSIONS

Lloyd J. Wolf, 2425 Irving Blvd., Dallas, Tex. 75207
Original application Apr. 22, 1963, Ser. No. 274,599, now Patent No. 3,255,837, dated June 14, 1966. Divided and this application May 2, 1966, Ser. No. 546,882
3 Claims. (Cl. 180—77)

This application is a division of my co-pending application Ser. No. 274,599, filed Apr. 22, 1963 and since issued as Patent No. 3,255,837.

The invention relates to motor vehicles and consists particularly in means for shifting gears of one of a pair of coupled motor vehicles, one manned and the other unmanned, responsive to the performance of this operation in the other vehicle of the pair.

Where manual gear shifts are used on both the vehicles, it is desirable to have them interconnected in such a way that shifting of one will cause simultaneous identical shifting of the other and it is necessary that the clutch on the unmanned vehicle be disengageable responsive to disengagement of the clutch on the manned vehicle and that the clutch on the unmanned vehicle be maintained disengaged throughout the shifting operation to prevent damage to the transmission of the unmanned vehicle.

It accordingly is the main object of the invention to provide means for simultaneous shifting of gears in a pair of motor vehicles responsive to manual shifting in one of the vehicles.

A further object is to provide an easily connectable and disconnectable mechanical linkage interconnection between the manual gear shift levers of a pair of vehicles for reproducing the movements of the lever in the control vehicle on the gear shift lever in the unmanned vehicle.

The foregoing and additional objects and advantages will be evident from the following description and the accompanying drawings, in which:

FIG. 1 is a side view of two automotive highway tractors, showing one form of the invention schematically.

FIG. 2 is a schematic view of the clutch control system shown in FIG. 1.

FIG. 3 is a perspective view of the gear shift control system.

FIG. 4 is an enlarged view, partially sectionalized, of the control cable connector portion of the gear shift control system.

FIG. 5 is a transverse vertical sectional view along line 5—5 of FIG. 4.

FIG. 6 is a schematic view of a modified form of the clutch control system.

FIG. 7 is an enlarged view of the lost motion connection of the gear shift control system.

Whenever the terms "normal" or "normally" are used throughout this specification and claims, they shall describe the at-rest position of the element to which they refer, unless otherwise indicated.

The numerals 1 and 3 refer respectively to separate motor vehicles coupled together by towing attachment 4 and each having the usual engine E and transmission T drivingly connected by the usual drive shaft S to rear axles A. Each vehicle also has a manual gear shift control including the usual hand levers 5 and 7 mounted in bases 9 and 11 on the floor of the vehicle cab, shifting of the gears in each vehicle being effected by combinations of fore-and-aft and transverse movements of levers 5 and 7. For causing lever 7 to reproduce the movements of lever 5, both levers are provided with inverted generally L-shaped arms 13 and 15, with their horizontal legs 17 and 19 fixed to the lower exposed portion of the lever and extending transversely of the vehicle. Their upright legs 21 and 23 are formed with vertical, or lengthwise slots 25 and 27. Fulcrum pins 29 and 31 are transversely aligned with the pivot points of levers 5 and 7 and affixed, by means of brackets 33 and 35, to bases 9 and 11. Pins 29 and 31 extend transversely therefrom through slots 25 and 27 in the upright legs 21 and 23 of arms 13 and 15, so that fore-and-aft movements of levers 5 and 7 will produce corresponding reverse movements of the lower ends of legs 21 and 23, and transverse movements of levers 5 and 7 will produce corresponding transverse movements of the lower ends of legs 21 and 23.

The lower ends of legs 21 and 23 are connected by a flexible motion-transmitting cable system 37 which consists of a length of sheathed cable 39 attached to the lower end of arm 13, and a similar length of cable 41 attached by means of lost motion connector 36 to the lower end of arm 15, cable 39 terminating at the rear end of forward motor vehicle 1 and cable 41 terminating at the forward end of rear motor vehicle 3. Lost motion connector 36 (as best seen in FIG. 7) comprises a rod or bolt 38 connected to the end of cable 41 adjacent arm 15, and fixedly mounting a pair of spaced collars or washers 44. Intermediate washers 44 an apertured block 46 is slidably mounted on rod 38 and is normally centered between collars 44 by springs 48, which are mounted on rod 38 between block 46 and collars 44. Block 46 is attached to the end of arm 15 by a threaded stud 50, so that, when cable 41 is translated by fore-and-aft shifting movements of gear shift lever 5 in the lead vehicle, if the gears of the trailing vehicle are out of registry, springs 48 will yield, permitting rod 38 to slide through block 46, until the gears come into registry; when this occurs, springs 48 will center block 46, causing the desired movement of lever 7 and completion of the shift. The rear end of cable 39 and the forward end of cable 41 terminate in rod portions 43 and 45, which project respectively from sheaths 40 and 42 of cables 39 and 41. A male fitting 47 is mounted on and pinned at 49 to the forward end of rod portion 45. Male fitting 47 is of generally cylindrical shape and its forward portion is formed with a recess 51 of U-shape in transverse section with the curved portion of the U concentric with the axis of the fitting, and intermediate its ends, recess 51 is formed with a transverse groove 53, also of U-shape. Forward rod portion 43 is provided with a collar 55 near its extremity and collar 55 is adapted to be fitted into groove 53 in male fitting 47 with rod 43 received in recess 51. A female fitting 57 is treadably or slidably mounted on rod member 43 and its recess is interiorly threaded as at 59 for engagement with the exterior threads 61 on the male member 47 so that when collar 55 is seated in groove 53, rod 43 can be held in fixed relation to rod 45 by tightening female member 57 on male member 47. For maintaining the sheaths 40 and 42 of the cable in fixed spaced relation, a clamping bar 63 is provided with upstanding ends 65 forked for reception in suitable slots 67 in the end portions of the cable sheaths 40 and 42. With this arrangement, it will be evident that any axial movements transmitted to cable 39, as a result of fore-and-aft movements of lever 5, will be transmitted through cable 39, threaded rod 45, cable 41, and lost motion connector 36, to arm 15, causing corresponding rotation of upright leg 23 about fulcrum pin 31 and thus producing the same fore-and-aft movement of lever 7 as was initiated by lever 5.

For transmitting transverse movements of lever 5, the lower end of arm 13 is connected by means of a transversely extending link 69 to an arm of a bell crank 71 fulcrumed at 73 on motor vehicle 1 and extending generally lengthwise thereof. The other arm of bell crank 71 extends generally transversely of the vehicle and is connected by means of a flexible cable system 75, similar in construction and operation to cable system 37, to a transversely extending arm of a bell crank 77 fulcrumed at 79 on motor vehicle 3. The other arm of bell crank 79 extends lengthwise of vehicle 3 and is connected by a transversely extending link 81 to the lower end of arm 15 so that any transverse movements of gear shift lever 5, acting through link 69, bell crank 71, flexible cable arrangement 75, bell crank 77 and link 81, will cause a corresponding transverse movement of gear shift lever 7 in motor vehicle 3.

It is essential that during gear shifting movements as described above, the clutches be disengaged in both motor vehicles 1 and 3 and that they remain disengaged during manipulations of lever 5 and resultant manipulations of lever 7 in accordance therewith. Operation of the clutches in both of the vehicles is provided by the arrangement shown schematically in FIG. 2, in which the clutch control in leading motor vehicle 1 includes the usual clutch pedal 83. Clutch pedal 83 is normally biased upwardly by spring 85 and is connected to normally open snap action switch 87, one terminal of which is connected by lead 89 to battery 91 and the other terminal of which is connected by lead 93 to solenoid 94 controlling closure member 96 of valve 95. Valve 95 is a three-way valve, one port of which is connected to piping 97 leading to a source of fluid pressure, preferably subatmospheric or vacuum, such as tank 92, which in turn is connected by suitable piping, including spring-loaded disk type check valve 108, to the intake manifold 99 of motor vehicle 3. Check valve 108 is normally closed and is arranged to open only in response to a predetermined pressure differential between tank 92 and manifold 99; i.e., when manifold pressure is less than tank pressure. This ensures that the manifold and tank are in communication only when manifold pressure is less than tank pressure and that the tank will accordingly be maintained at subatmospheric pressure. A second port of valve 95 is connected by piping 101 to vacuum cylinder 103, piston rod 105 of which is connected by link 107 to the clutch control of motor vehicle 3 comprising clutch pedal 109. Normally valve closure member 96 is in the position illustrated in FIG. 2, preventing communication between cylinder 103 and tank 92, so that spring 104 in cylinder 103 biases clutch pedal 109 to the engaged position. When clutch pedal 83 of motor vehicle 1 is depressed to disengage the clutch of motor vehicle 1, switch 87 is closed, energizing solenoid 94 and causing valve closure member 96 to rotate counterclockwise and thus provide communication between pipe 101 leading to cylinder 103 and pipe 97 leading to tank 92. Vacuum is thereby introduced into cylinder 103, causing piston 105 and link 107 to move to the left as seen in FIG. 2, and thus correspondingly depressing clutch pedal 109 of motor vehicle 3 to disengage the clutch of this vehicle. The third port of valve 95 is connected by pipe 111 to a second normally closed valve 113, have a closure member 112 and an atmosphere vent port 116 so that, when clutch pedal 83 is released, and the clutch of leading motor vehicle 1 becomes engaged, switch 87 opens, deenergizing solenoid 94 and providing communication between pipes 101 and 111 but closing communication between pipe 101 and tank 92. Since, in its normal position valve 113 is closed, the vacuum in cylinder 103 is maintained.

Preferably closure member 112 of valve 113 is operated by a solenoid 114, which is connected by lead 115 to normally open switch 117, which in turn is connected by wire 119 to battery 91 so that while switch 117 is in its normally open position, valve 113 remains closed and the vacuum is maintained in cylinder 103, holding the clutch of trailing motor vehicle 3 disengaged. Switch 117 is operated by the throttle control system of the second vehicle. Alternatively, switch 117 might be normally closed and solenoid 114 arranged, when thus normally energized, to maintain valve 113 closed, the solenoid then being deenergized and the valve opened by the throttle control system of the second vehicle to vent cylinder 103 and permit reengagement of the clutch.

For controlling the throttle of the second vehicle in accordance with movements of the throttle in the leading vehicle 1, a throttle control system such as that disclosed in my Patent No. 3,027,962 (FIG. 8 thereof) may be used. With this arrangement, accelerator pedal 121 of the leading vehicle is connected to a normally open exhaust valve 123 in a vacuum line 125–127 leading to engine driven positive displacement vacuum pump 129 of the trailing vehicle 3. Vacuum lines 125 and 127 are mounted respectively in the leading and trailing vehicles and are connected by suitably flexible hose connection 128 to permit relative turning movements of the two vehicles. A branch 131 of vacuum line 127 leads to throttle operating cylinder 133, the piston rod 135 of which is arranged to open throttle valve 137 of the trailing vehicle when vacuum in cylinder 133 exceeds a predetermined value. Piston rod 135 is also connected to switch 117 and is arranged to close switch 117 when the vacuum in cylinder 133 exceeds a predetermined value. When this occurs, solenoid 114 is energized, rotating the closure member of valve 113 to vent pipe 111 to the atmosphere thus, through valve 95 and pipe 101, breaking the vacuum in clutch cylinder 103 and permitting spring 104 to return clutch pedal 109 to its engaged position. Thus, irrespective of when clutch pedal 83 of leading vehicle 1 is released and the clutch thereof consequently engaged, clutch pedal 109 will be held in the down or disengaged position until the speed of the engine of the second vehicle, as reflected in the vacuum produced by the engine driven positive displacement vacuum pump 129, reaches a predetermined value, at which time switch 117 closes, energizing solenoid 114 and thereby through valve 113 venting the second vehicle clutch control cylinder 103 to the atmosphere, with resultant engagement of clutch 109.

In the event that the alternative normally closed switch 117 be provided, piston rod 135 would be arranged to open switch 117 when vacuum in cylinder 133 exceeded a predetermined value thus deenergizing solenoid 114 and opening valve 113 to the atmospheric vent position, with resultant return of clutch pedal 109 to engaged position, as described above.

Operation of this form of the invention is as follows: Vehicles 1 and 3 are coupled to each other by draw bar 4. To secure the gear shift systems of the two vehicles in operative relation, clamp 63 is attached to the adjacent ends of cable sheaths 40 and 42, collar 55 on the protruding threaded rod end 43 of cable 39 is seated in U-slot 53 of male coupling fitting 47, female fitting 57 is rotated on or slid along rod 43 until it threadably engages the male fitting 47 and is rotated until the two fittings are secured in the position shown in FIG. 4, in which the male fitting abuts the forward end of the recess in the female fitting. Cable system 75 is then similarly connected, so that all axial movements of the forward cables will be transmitted exactly to the rear cables. Vacuum lines 125 and 127 are thus connected by means of hose connection 128, electric leads 93 and 119 are connected, and the coupled vehicles are ready to be driven. After starting both engines, clutch pedal 83 of the leading vehicle 1 is depressed to disengage the clutch of the leading vehicle and it closes switch 87 thereby energizing solenoid 94 and providing communication by means of valve 95 and pipes 97 and 101 between intake manifold 99 of the second vehicle and clutch control cylinder 103 of the second vehicle thereby causing movement of clutch pedal 109 of the second vehicle to the disengaged position. Gear shift lever 5 of the leading vehicle is thereupon manipulated as desired either by a transverse movement or a fore-and-aft movement or a combination of both movements which movements are transmitted by means of arm 13, cable systems 37 and 75 and arm 15 to gear shift lever 7 of the trailing vehicle 3. Clutch pedal 83 of the leading vehicle will then be released permitting engagement of the clutch thereof, but to provide some time delay in the reengagement of the clutch of the second vehicle, even though switch 87 was opened by release of the primary vehicle clutch pedal, and valve 95 brought the clutch control cylinder 103 into communication with closed valve 113, since the latter was closed, the vacuum was maintained in cylinder 103 and clutch pedal 109 continued in the disengaged position. As accelerator pedal 121 of the leading vehicle was depressed to open throttle valve 122, valve 123 was closed, thereby causing the application of vacuum from pump 129 to throttle control cylinder 133 of the second vehicle, to open the throttle of the second vehicle and thereby increase the speed of the engine of the second vehicle and the amount of vacuum produced by the positive displacement vacuum pump 129. Since an increase in engine speed is accompanied by a proportionate increase of vacuum in cylinder 133, when the engine speed and vacuum reach a predetermined value, switch 117 controlling valve 113 is closed, to energize valve 113 and thereby vent clutch control vent clutch control cylinder 103 to the atmosphere permitting spring 104 to return clutch pedal 109 to the engaged position. Thus, ample time is provided for completion of the shifting movement of a second vehicle gear shift lever 7.

In the embodiment of the invention shown in FIG. 6, the clutch pedal 137 of the leading vehicle is operatively connected to a snap action switch 139 by means of a cammed surface 141 engaging operating arm 143 of the switch, one lead 145 of which is connected to battery 147, the other lead 149 of which is connected to solenoid 151. Arm 153 of solenoid 151 is connected by link 155 to operating arm 157 of valve 159, closure member 160 of which is normally in the position shown in FIG. 6. Valve 159 is connected by pipe 161, including tank 163 and check valve 164, similar in structure and function to tank 96 and check valve 108 described above, to intake manifold 99 of trailing vehicle 3, and on its other side valve 159 is connected by pipe 167 to vacuum cylinder 169, communication between pipes 161 and 167 normally being closed by closure member 160. Valve 159 also has an atmospheric vent port 170 which is normally in communication with pipe 167. The piston rod 171 of cylinder 169 is connected to clutch pedal 173 of the trailing vehicle which is normally biased to the engaged position by spring 174 so that when the clutch pedal 137 of the leading vehicle is depressed, disengaging the leading vehicle clutch, and closing switch 139, solenoid 151 is energized causing its arm 153 to rotate counterclockwise and thereby move valve 159 to provide communication between second vehicle intake manifold 99 and clutch control vacuum-cylinder 169, and close communication between pipe 167 and vent port 170. This causes movement of the piston and its rod 171 to the left, as viewed in FIG. 6, with consequent depression of the clutch pedal 173 of the second vehicle and disengagement of the second vehicle clutch. For holding the second vehicle clutch disengaged after the leading vehicle clutch has been reengaged and the circuit 145, 149 through switch 139 broken, a second snap action switch 175 is connected by link 177 to arm 153 of solenoid 151 so that when the latter was energized by the closure of switch 139 and arm 153 moved counterclockwise to open valve 159, switch 175 was closed. One of the leads 179 from switch 175 is connected to lead 149 of solenoid 151 and the other lead 181 from switch 175 is connected to a third snap action switch 183, normally maintained in closed position in a manner to be described below, the other lead 185 of which is connected to battery 187 of the trailing vehicle so that even after switch 139, controlled by the primary clutch pedal 137, is opened, solenoid 151 will continue to be energized by current from battery 187 passing through line 185 normally closed switch 183, lines 181, 179 and 149, thus holding valve 159 open and maintaining the vacuum in cylinder 169 whereby to keep the clutch of the second vehicle disengaged. The operating arm 189 of switch 183 is positioned so as to be engaged by a collar 191 on throttle control piston rod 135, thus holding the switch closed when vacuum in cylinder 133, created by positive displacement vacuum pump 129, is below a predetermined value, and to be disengaged by collar 191 when the vacuum reaches a predetermined value sufficient to move piston rod 135 to the right (FIG. 6), thus permitting switch 183 to open, thereby breaking all circuits through solenoid 151 and moving valve 159 to its vent position whereby cylinder 169 is vented to the atmosphere through vent port 170 and spring 174 returns clutch pedal 173 to its normal or engaged position.

Operation of the embodiment shown in FIG. 6 is as follows: When clutch pedal 137 is depressed, normally open switch 139 is closed, thus energizing solenoid 151 and causing valve 159 to move to the open position providing communication between tank 163 and clutch control cylinder 169, thereby causing movement of clutch pedal 173 of the second vehicle to its disengaged position. Gear shift lever 5 is manipulated as desired and its movements are reproduced by gear shift lever 7 of the second vehicle by virtue of the linkage connections therebetween. Clutch pedal 137 of the first vehicle is then released to permit reengagement of the clutch of the leading vehicle. This opens switch 139, but does not deenergize solenoid 151 since the valve-opening movement of solenoid 151 had closed switch 175 which provided current from battery 187, through line 185, switch 183 and lines 181, 179 and 149 to the solenoid. The solenoid, remaining energized, retains valve 159 in the position providing communication between tank 163 and clutch control cylinder 169 thereby maintaining the second vehicle clutch pedal 173 in the disengaged position. As the accelerator pedal 121 of the leading vehicle is depressed to open throttle valve 122 thereof, it closes vacuum vent valve 123, causing the application of vacuum from pump 129 to throttle control cylinder 133 of the second vehicle. This in turn causes opening movement of the second vehicle throttle and increase in engine speed and increase of speed in vacuum pump 129 and a proportionate increase in vacuum produced thereby. When a predetermined speed is reached and a consequent predetermined vacuum is achieved throttle control piston rod 135 permits switch 183 to open thereby deenergizing solenoid 151 of valve 159 and causing the same to vent cylinder 169 to the atmosphere through port 170. This permits spring 174 to return clutch pedal 173 of the second vehicle to the engaged position. The delay provided eliminates the danger of damage to transmission gears of the second vehicle by premature engagement of the second vehicle clutch.

The invention may be modified in various respects as will occur to those skilled in the art and the exclusive use of all modifications as come within the scope of the appended claims is contemplated.

What is claimed is:

1. A gear shift control system for coupled motor vehicles comprising substantially upright hand levers in each of the vehicles arranged for pivotal movements lengthwise and transversely of the vehicles, an arm on each of said levers extending transversely of the vehicle and parallel to the lever, said arms being fulcrumed to said vehicle on transverse axes, first linkage means extending lengthwise of the vehicles and connecting portions of said arms remote from their fulcrum axes, bell cranks fulcrumed on each of the vehicles and each having an arm extending substantially lengthwise of the vehicle and an arm extending substantially transversely of the vehicle, transversely extending linkage means connecting portions of said lever arms remote from their fulcrum axes to the longitudinal arms of said bell cranks, and further linkage means connecting the transverse arms of said bell cranks to each other.

2. A gear shift control system according to claim 1 in which each of said first and further linkage means comprises a pair of sheathed control cables terminating respectively at adjacent ends of the motor vehicles, means holding the cable sheaths against relative axial movement, the ends of the cables projecting from the adjacent ends of the vehicles, and a detachable coupling connecting the projecting ends of the cables and securing the same against relative axial movement.

3. A gear shift control system according to claim 2 in which the projecting end of one of said cables mounts for axial movement thereon a female fitting having an axial recess open toward the end of the cable and rigidly mounts a collar between said female fitting and its end, a male fitting fixedly mounted on the projecting end of said other cable and having an axial recess open at one side adapted to receive the end portion of said one cable and a groove in the side walls thereof adapted to receive said collar, said female fitting being adapted to threadably receive said male fitting by axially moving and rotating said female fitting along and about the end of said one cable.

References Cited

UNITED STATES PATENTS 2,135,906  11/1938  Merry ---------------- 180—77

A. HARRY LEVY, *Primary Examiner.*